United States Patent [19]

Dickinson

[11] 3,999,005
[45] Dec. 21, 1976

[54] SECURE TRANSMISSION OF AM OR FM SIGNALS

[75] Inventor: Robert V. C. Dickinson, Berkeley Heights, N.J.

[73] Assignee: ECom Corporation, Berkeley Heights, N.J.

[22] Filed: Dec. 26, 1974

[21] Appl. No.: 536,539

[52] U.S. Cl. .............................. 358/259; 325/60; 325/65
[51] Int. Cl.² ........................................ H04N 1/44
[58] Field of Search ............... 178/5.1, DIG. 13; 325/60, 65, 308

[56] References Cited
UNITED STATES PATENTS

| | | | |
|---|---|---|---|
| 3,081,376 | 3/1963 | Loughlin et al. | 178/5.1 |
| 3,084,329 | 4/1963 | Clay | 325/65 |
| 3,353,099 | 11/1967 | Hayasi et al. | 325/60 |
| 3,852,519 | 12/1974 | Court et al. | 178/5.1 |
| 3,896,262 | 7/1975 | Hudspeth et al. | 178/5.1 |

Primary Examiner—Maynard R. Wilbur
Assistant Examiner—S. C. Buczinski
Attorney, Agent, or Firm—Ladas, Parry, Von Gehr, Goldsmith & Deschamps

[57] ABSTRACT

A method and system for scrambling amplitude-modulated or frequency-modulated signals at a transmitter and descrambling the scrambled signals at a receiver. The scrambling is effected at the transmitter by shifting the phase of only the carrier component of the modulated signal by from 80 to 100 carrier degrees, preferably exactly 90 carrier degrees, the phase shift either advancing or retarding the carrier component out of its proper phase relationship with the side band components of the modulated signal in the transmitted version of the modulated signal. The descrambling of the transmitted version of the modulated signal is effected in a receiver, prior to demodulation therein, by restoring the carrier component back into its proper phase relationship with te side band components of the modulated signal. Without such restoration, a scrambled AM signal transmission substantially appears to be an FM signal at an AM demodulator of a receiver and an FM signal transmission substantially appears to be an AM signal at an FM demodulator of a receiver. The method and system thus have particular utility in connection with pay television, since they involve a technique whereby a signal scrambling may be readily carried out at a pay television transmitter on the video AM portion of a television signal or on the audio FM portion thereof or on both portions thereof and a descrambling of the scrambled signal may be readily carried out at a subscriber's television receiver.

16 Claims, 12 Drawing Figures

SECURE TRANSMISSION OF AM OR FM SIGNALS

BACKGROUND OF THE INVENTION

Signal scrambling and descrambling has been effected heretofore in a number of different ways with a view to restricting intelligible reception to those for whom such reception is intended. Thus, for example, audio information has been scrambled prior to its being used for modulating a carrier wave for wireless or cable transmission and has been descrambled at authorized receivers after the received modulated carrier wave has been demodulated. Another known secure transmission technique has involved a 180° phase inversion of either sideband or carrier components of a modulated signal with subsequent reinversion at a receiver. In cable television systems, it has moreover been known to transmit video sidebands while partially or completely suppressing the carrier, such transmission being accompanied by the transmission of a pilot signal having a frequency of some precise submultiple, e.g. one-half, of the carrier frequency and in phase with the carrier. Then, prior to carrying out the demodulation process in the receiver, the pilot signal is multiplied by the factor necessary to reestablish the carrier frequency and phase. This technique, however, is not employable for those wireless transmissions which must be within assigned frequency bands coinciding with the bands for which the receiver is designed, nor for cable systems not having unused or available spectra to accommodate such pilot signals. And, the 180° phase inversion technique has somewhat less than the security required for video signal transmission in pay television systems, as the sync circuits of unauthorized receivers can fortuitiously lock on to such a transmission and result, at least occasionally at random, in the production of an intelligible picture.

SUMMARY OF THE INVENTION

By means of the method and system of the present invention, a highly secure transmission of an AM or FM signal is obtained by shifting the phase of only the carrier component of the modulated signal by from 80 to 100 carrier degrees, preferably exactly 90 carrier degrees. An intelligible demodulation of the signal is then obtained in a receiver after restoring the carrier component to its original phase relationship with the side band components of the signal. When the carrier component has been advanced in phase prior to transmission to scramble the signal, it will be retarded in phase at the receiver to descramble the signal, and vice-versa. In either case, a restoration of the carrier component back into its proper phase relationship with the side band components of the modulated signal is effected.

Although the invention is clearly applicable to the scrambling and descrambling of AM or FM signals in general, a particularly interesting application of the invention is found in the field of pay (subscriber) television. These the invention may be applied at the pay television transmitter and a subscriber receiver, respectively, to scramble and descramble the video AM portion of a television signal or the audio FM portion thereof or both portions thereof. The video AM portion of a television signal, when scrambled in accordance with the principles of this invention at the transmitter, will appear to the AM signal demodulator of the television receiver of a non-subscriber to be, in essence, an FM signal. Thus, the AM signal demodulator will produce substantially no output and will present the unauthorized viewer with a substantially blank screen. In this connection, it will be appreciated that total elimination of the demodulation output is not attainable due to the standardized use of vestigal sideband transmission in order to limit each television channel to a 6 mhz FCC imposed bandwidth and still allow a 4 mhz bandwidth for the video signal, whereby the lower sideband is nonexistent at modulation frequencies above approximately 600 khz. The picture synchronizing pulses being of relatively low frequency will be lost but at the higher frequencies, there will be some output from the AM signal demodulator due to the upper sideband. However, it will generally be low in amplitude and, more importantly, high enough in frequency to present the unauthorized viewer with a screen having only very fine elements of the picture which, as a practical matter, leaves virtually nothing to be seen. A normal picture, however, will be obtained at a subscriber's receiver by descrambling the scrambled video AM portion of the received signal before it reaches the AM signal demodulator.

The audio FM portion of a television signal, when scrambled in accordance with the principles of this invention at the transmitter, will appear to the FM signal demodulator of the television receiver of a non-subscriber to be, in essence, an AM signal and will consequently be substantially erased by the limitors of the demodulator, whereby the unauthorized listener will be presented with substantially no sound. Normal sound, however, will be obtained at a subscriber's receiver by descrambling the scrambled audio FM portion of the received signal before it reaches the FM signal demodulator.

It is accordingly an object of the invention to provide improvements in or relating to the secure transmission of modulated signals having a carrier component and side band components.

Another object of the invention is to provide secure transmission of a modulated signal of one modulation type by so modifying the signal that it substantially appears to a demodulator for that modulation type to be a modulated signal of a different modulation type.

Another object of the invention is to provide secure transmission of an AM signal by so modifying the signal that it substantially appears to an AM signal demodulator to be an FM signal.

Another object of the invention is to provide secure transmission of an FM signal by so modifying the signal that it substantially appears to an FM signal demodulator to be an AM signal.

Another object of the invention is to scramble an AM or FM signal prior to transmission by shifting its carrier component in phase by from 80° to 100° relative to its side band components and, prior to demodulation, to descramble the scrambled signal by restoring the phase-shifted carrier component into its proper phase relationship with the side band components.

Another object of the invention is to scramble a composite television signal, prior to wireless or cable transmission thereof, by phase shifting at least one carrier component thereof by about 90° relative to its sideband components, and to descramble the signal in a television receiver, prior to demodulation, by phase shifting the carrier component back to its unscrambled phase relationship with its sideband components.

BRIEF DESCRIPTION OF THE DRAWING

The foregoing and further objects, features and advantages of the invention will become more apparent from the following detailed description when read in conjunction with the accompanying drawing, in which.

DESCRIPTION OF THE PREFERRED EMBODIMENTS

Figure 1:
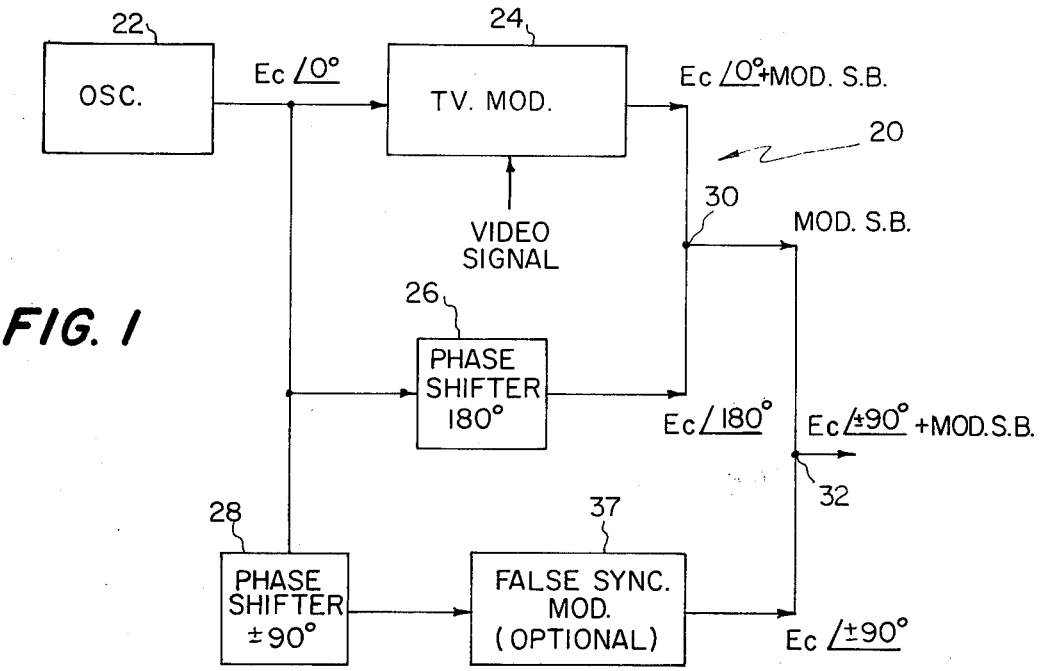
FIG. 1 is a block diagram of a first embodiment of a scrambler constructed in accordance with the principles of the present invention and applied to original television programming.

Referring now to the drawing, and more particularly, to FIG. 1 thereof, there is depicted a scrambler constructed pursuant to the principles of the present invention and designated generally by the reference numeral 20. The scrambler 20 is utilized in TV systems wherein the scrambling of information takes place at the source of programming and origination of the television signals. The scrambler 20 includes the oscillator 22, the television modulator 24, a 180° phase shifter 26 and a 90° phase shifter 28. For purposes of simplicity of discussion, the modulator 24 shall be deemed to provide the video AM portion of a television signal. Thus, the output of oscillator 22 is the carrier component $E_c \angle 0°$ which is amplitude modulated by a video signal input to modulator 24. The output of modulator 24 therefore consists of the carrier component and upper and lower sideband components which make up the video AM portion of the television signal. The carrier component is also applied to the 180° phase shifter 26 to produce an output voltage which is equal to $E_c \angle \pm 180°$. The carrier component is also applied to the 90° phase shifter 28 to produce an output voltage $E_c \angle \pm 90°$. The output voltages of modulator 24 and phase shifter 26 combine at terminal point 30 such that the resultant output voltage at 30 contains only the sideband components which are thereafter combined with the $E_c \angle \pm 90°$ output voltage of phase shifter 28 at terminal point 32. The resultant output voltage at 32 and thus of the scrambler 20 is the phase shifted carrier $E_c \angle \pm 90°$ plus the sideband components.

Figure 2:
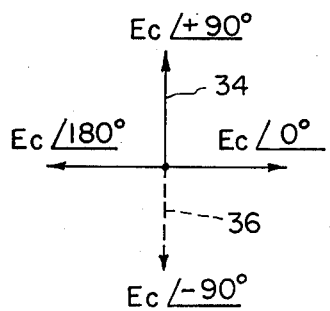
FIG. 2 is a vector diagram of the voltages presented in FIG. 1.

If the phase shifter 28 is operative to impart a leading phase shift of +90° to the carrier component $E_c \angle 0°$, the resultant will be the vector designated by the numeral 34 in FIG. 2. If the imparted phase shift is lagging, −90°, the resultant vector will be 36, as shown dotted in FIG. 2.

If it is desired to further scramble the transmission, the scrambler 20 may be provided with a false synchronization modulator 37 which applies a modulation signal upon the phase shifted carrier component $E_c \angle \pm 90°$. Since this represents AM modulation of the carrier component in the scrambled transmission, AM detection of this false synchronization signal by the receiver will result in an extraneous signal which will affect the receiver synchronization circuits. Thus, in one application, the introduction of a synchronization signal whose frequency which is slightly higher (or lower) than the normal vertical synchronization frequency will cause the resultant picture to continuously "roll", further confusing the resultant visual signal display. It is herein to be noted that these false synchronization signals are carried as AM sideband signals in the resultant scrambled visual transmission signal and as such, will be related in a quadrature fashion to the properly phased carrier upon descrambling and will not cause any output signal from the video demodulator.

While the foregoing discussion has been limited to the scrambling of the video AM portion of a television signal transmission, it is to be noted that for purposes of the description of the present invention, as to the embodiments hereinbefore and hereinafter discussed, that the audio FM portion can also be similarly scrambled. In this regard, it is to be noted that when the carrier component of the audio FM portion is shifted by 90° relative to the sideband components thereof, the resultant signal will effectively be an AM signal. When this signal appears in the receiver sound channel, the modulation information will be eliminated or essentially erased by the limiters of the FM signal demodulator in the receiver sound channel. Moreover, in a manner similar to the application of false synchronization to the scrambled video AM portion, false audio can be applied to the scrambled audio FM portion. The false audio can be made to impart a disagreeable audio tone to the listener, or it could contain intelligible information, such as information informing the listener that he was trying to view a scrambled channel and that service therefor was available by contacting the proper persons.

Figure 3:
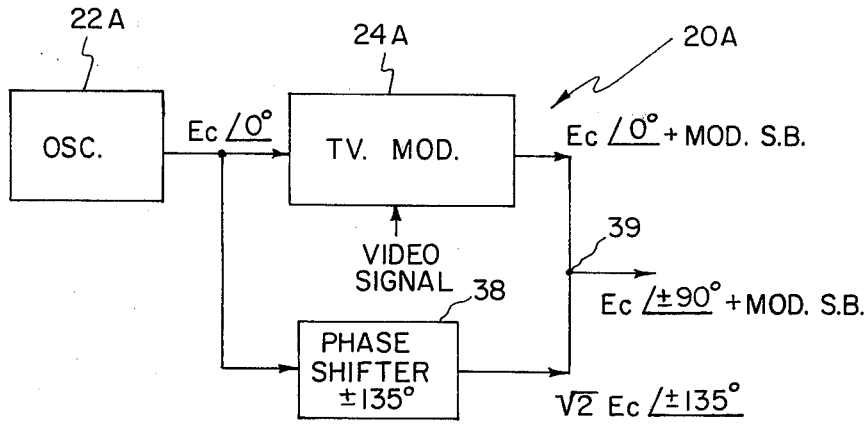
FIG. 3 is a block diagram of a second embodiment of a scrambler applied to original television programming.

Referring now to FIG. 3, there is depicted an alternate embodiment of a scrambler operative at the source of programming and designated generally by the reference numeral 20A. The scrambler 20A includes oscillator 22A, modulator 24A and a 135° phase shifter 38. The phase shifter 38 is also operable to amplify the input carrier component $EC \angle 0°$ applied thereto by a factor of $\sqrt{2}$, such that the resultant signal output of phase shifter 38 is expressed as follows:

$$E_1 = \sqrt{2} E_c \angle \pm 135°.$$

Figure 4:
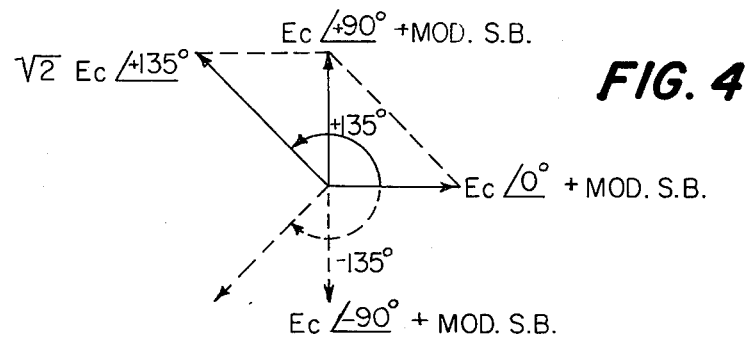
FIG. 4 is a vector diagram of the voltages presented in FIG. 3.

Thus, the output of scrambler 20A appeaing at terminal 39 is the vector sum of the signals $E_c \angle 0°$ + MOD.S.B. and $E_1$. As best seen in FIG. 4, this sum is equal to $E_c \angle \pm 90°$ + MOD.S.B. It is, therefore, apparent that the outputs of scramblers 20 and 20A are precisely the same.

While FIG. 3 is specific to the provision of a 90 degree phase displacement of the carrier component in the output, it is within the purview of the present invention that the phase displacement may be any value from 80° to 100°. Thus for values other than 90° within this range, the amplification factor and phase shift provided by phase shifter 38 would be different from $\sqrt{2}$ and 135°, respectively. A general formula for the phase shift to be imparted by phase shifter 38 is (A+180°)/2, where A is the desired phase displacement of the carrier component at the scrambler output. Based on the law of sines, a general formula for the amplification factor of phase shifter 38 is $$\frac{\sin A}{\sin\left(\frac{180° - A}{2}\right)}$$

Thus, for example, if A is 80°, the phase shift imparted by phase shifter 38 will be (80°+180°)/2 or 130°, and the amplification factor will be (0.985/0.766) or 1.286.

Figure 5:
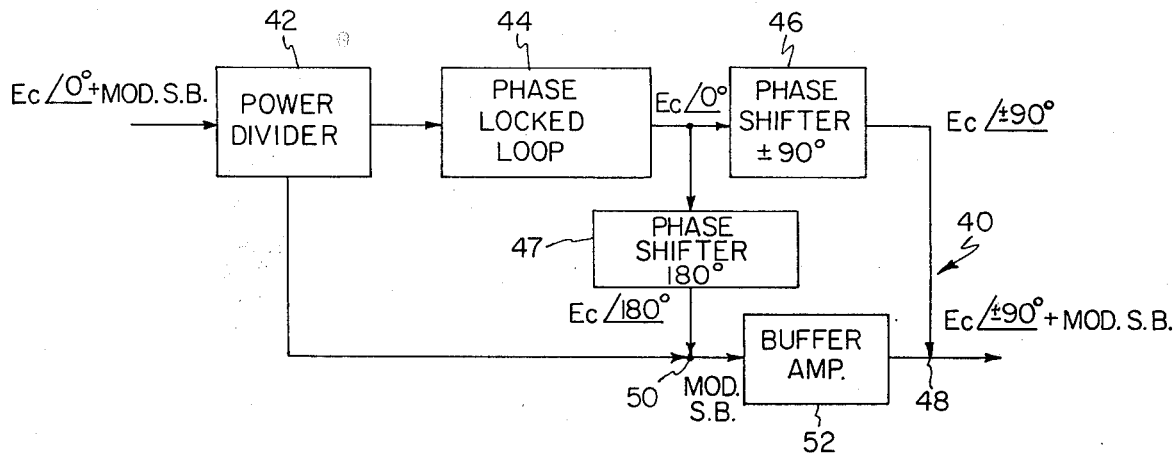
FIG. 5 is a block diagram of a third embodiment of a scrambler applied to existing TV signals.

Referring now to FIG. 5, there is depicted a scrambler 40 operative in conjunction with existent television signals the video AM portion of which is denoted Ec $/0°$ + MOD.S.B. where Ec $/0°$ is the carrier component and MOD.S.B. are the modulation sideband components. The voltage Ec $/0°$ + MOD.S.B. is fed to a power divider 42. One output of the divider 42 is fed to a phase locked loop 44 which is operative to lock to the phase of its input and thus produce an output Ec  0° which is applied to a 90° phase shifter 46 and a 180° phase shifter 47. The output of phase shifter 46 (Ec $/\pm 90°$) is then fed to terminal output point 48.

The other output of divider 42 is fed to a terminal point 50 where it is combined with the ouptut of phase locked loop 44 shifted 180° by phase shifter 47 whereat the signals combine to cancel the carrier component Ec $/0°$ of the incoming signal leaving only the modulation sidebands MOD.S.B. The terminal point 50 is isolated from terminal 48 by means of a buffer amplifier 52 to prevent interaction. The output at terminal 48 is Ec $/\pm 90°$ plus the modulation sidebands MOD.S.B.

The phase locked loop 44 is of known construction and the particular type chosen is dependent upon various factors, as is discussed in the treatise thereon entitled Phase Locked Techniques by F. M. Gardner published by Wiley (2nd edition-1967). Thus, when the scrambler 40 operates in conjunction with the audio FM portion of an existing television signal, the phase locked loop 44 will have a narrower band width than that of the lowest modulation frequency, i.e. less than 30 Hz and preferably about 5 Hz for normal audio frequencies, so that it will lock on to the phase of the carrier component only and be unaffected by the sideband components.

Figure 6:
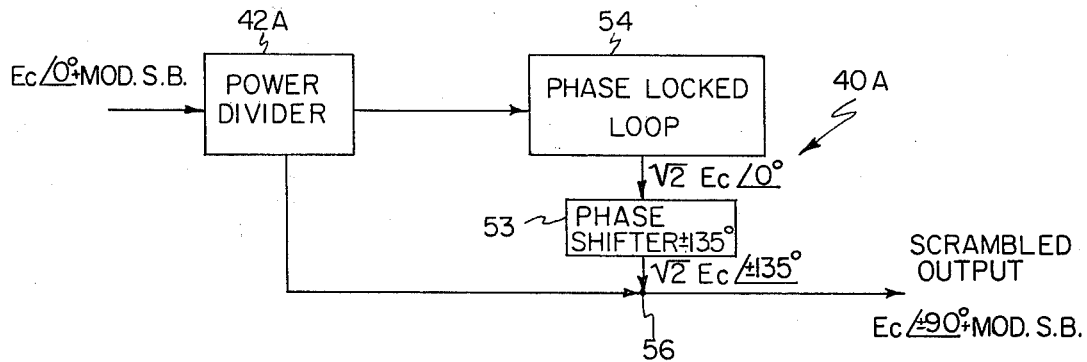
FIG. 6 is a block diagram of a fourth embodiment of a scrambler applied to existing TV signals.

An alternate embodiment of the scrambler 40 is illustrated in FIG. 6 and is generally designated by the reference numeral 40A. The encoder 40A includes a power divider 42A and a phase locked loop 54. The first output from divider 42A is fed to the phase locked loop 54. Without effecting any phase shift, the loop 54 is effective to amplify the carrier component by $\sqrt{2}$. The phase shifter 53 imparts a 135° phase shift to Ec $/0°$ thereby producing an output voltage $\sqrt{2}$ Ec $/\pm 135°$, which voltage is combined with the second output of divider 42A (Ec $/0°$ plus modulation sidebands). The resultant voltage appearing at the terminal point 56, and thus the output voltage of encoder 40A, is Ec $/\pm 90°$ plus the modulation sidebands.

Figure 7:
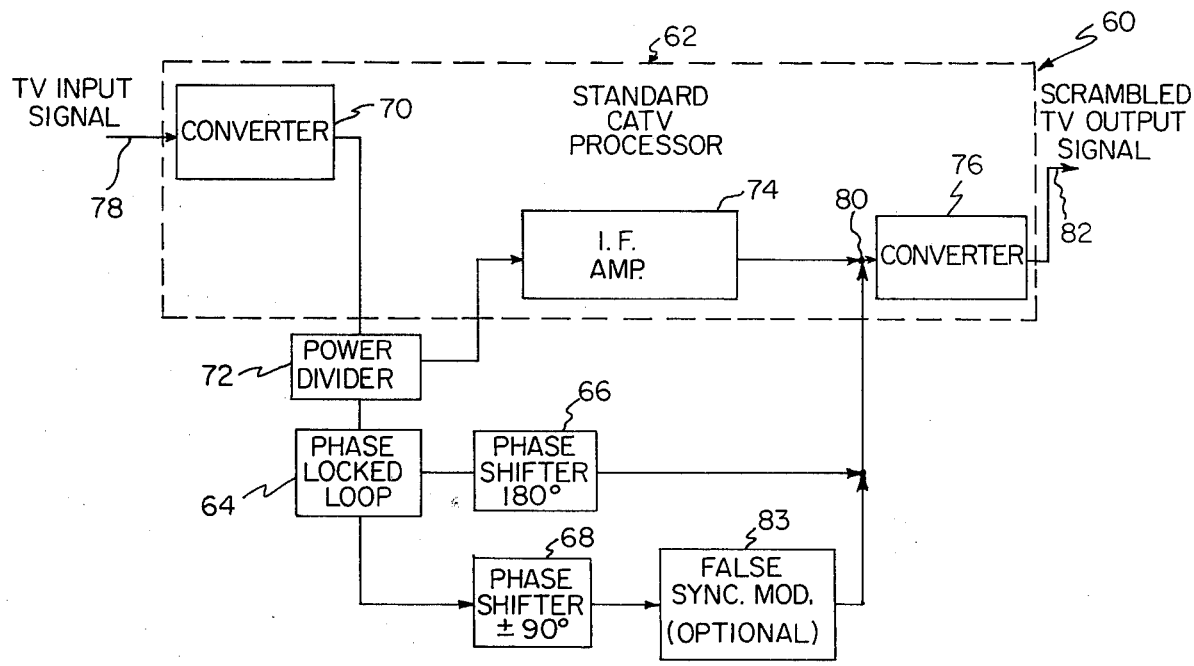
FIG. 7 is a block diagram of another embodiment of a scrambler applied to a cable television system.

With reference now to FIG. 7, there is illustrated a scrambler 60 for use with existing cable television systems and processing apparatus. Scrambler 60 includes a standard CATV processor 62, a power divider 72, a phase locked loop 64, a 180° phase shifter 66 and a 90° phase shifter 68. The processor 62 comprises a standard type frequency converter 70, an IF amplifier 74 and an output frequency converter 76.

A modulated TV input signal 78 is applied as an input signal to the standard CATV processor 62 and, more particularly, to the frequency converter 70 thereof. The resultant signal is then fed to the power divider 72 which is used to sample the incoming signal at i.f. frequency, with one output of divider 72 being fed to the amplifier 74 and the other output being fed to the phase locked loop 64. The output of the phase locked loop 64 whose level corresponds to the output of the amplifier 74 is fed to the 180° phase shifter 66 and the phase shifted signal is fed therefrom to the terminal point 80. The phase shifted signal at terminal point 80 is then combined with the modulated output from amplifier 74 in order to essentially cancel the carrier component of the incoming signal at the IF frequency.

The other output from the phase locked loop 64 is fed to the 90° phase shifter 68 and thence to the terminal 80. Thus, the only apparent signal at terminal 80 is the original signal with its carrier displayed by the phase shift of 90°. The signal appearing at terminal 80 is then fed through converter 76 and appears at the scrambled TV output signal 82. It will be appreciated that the signal 82 comprises the original signal components with a 90° phase shifted carrier component, all at an output frequency determined by the action of frequency converters 70 and 76.

If desired, the scrambler 60 may be provided with a false synchronization modulator designated 83 connected between the phase shifter 68 and the terminal 80. The purpose and function of modulator 83 is the same as that of modulator 37 discussed hereinbefore in conjunction with FIG. 1.

Figure 8:
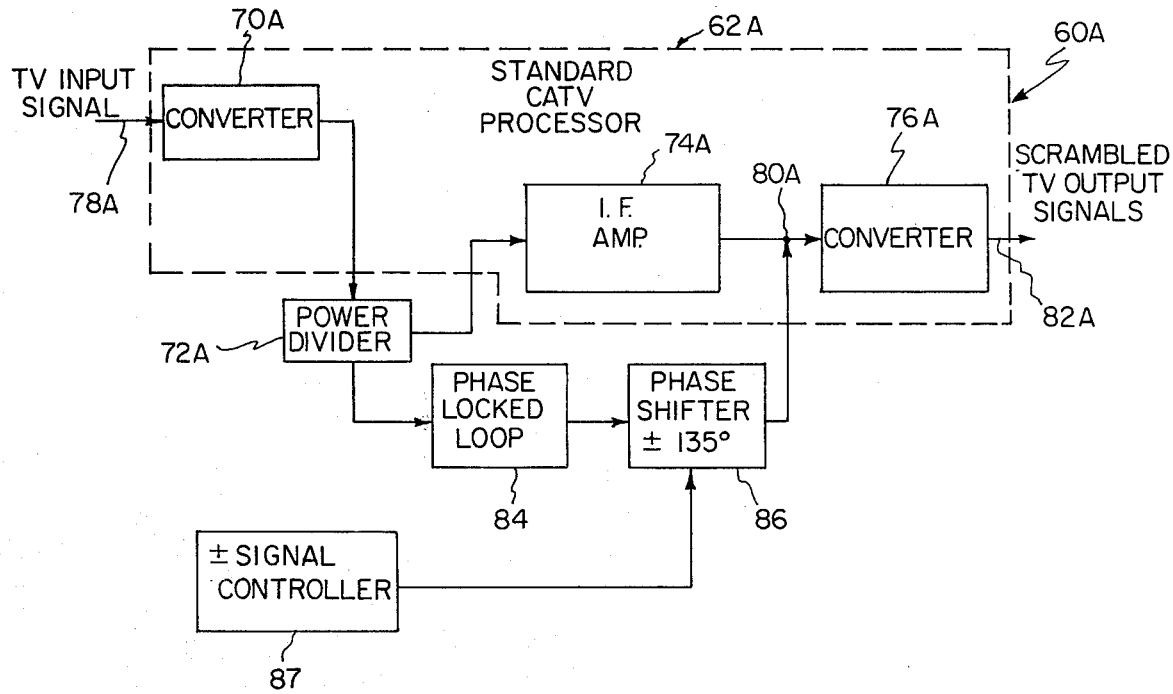
FIG. 8 is a block diagram of an alternate embodiment of a scrambler applied to a cable television system.

FIG. 8 illustrates a modified version of the scrambler of FIG. 7, designated 60A, wherein similar parts are denoted by similar reference numerals. In this version, the input signal 78A is fed to the frequency converter 70A of the standard CATV processor 62A and the converted signal is applied to power divider 72A with one output of the divider being applied to the IF amplifier 74A whose amplified output is fed to the terminal point 80A. The other output of divider 72A is fed to the phase locked loop 84 and thence to the 135° phase shifter 86. It is herein to be noted that the phase locked loop 84 is effective to amplify the signal applied thereto by the factor $\sqrt{2}$, whereby its level is $\sqrt{2}$ times that of the output of amplifier 74A. The amplified and 135° phase shifted signal is then combined with the output signal of amplifier 74A at terminal 80A to produce a resultant signal of desired amplitude whose carrier component is 90° out of its proper phase relationship with the side band components, as described previously in conjunction with FIG. 6. The signal is then converted to the desired predetermined carrier frequency by means of the frequency converter 76A and appears as the desired scrambled TV output signal at the output 82A of the processor 62A.

If it is desired to scramble the signal still further, the phase shifter 86 can be controlled from time to time to change the sense (lagging or leading) of the phase shift it imparts.

The foregoing can be accomplished by providing a suitably programmed signal controller 87 whose output is connected in controlling relation to the phase shifter 86.

Figure 9:
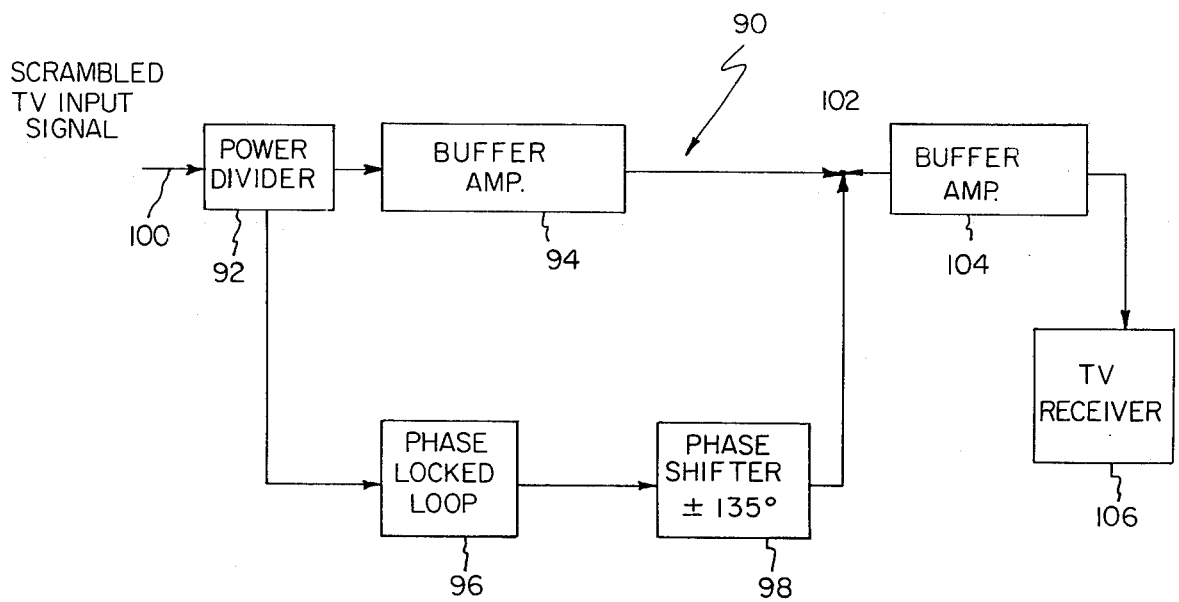
FIG. 9 is a block diagram of a first embodiment of a descrambler constructed in accordance with the principles of the present invention.

With reference now to FIG. 9, there is depicted a first embodiment of a descrambler constructed pursuant to the principles of the present invention and which is operative to descramble scrambled video AM portions of television signal transmissions of the scramblers depicted and discussed in conjunction with FIGS. 1 through 8. The descrambler is generally designated by the reference numeral 90 and comprises a power divider 92, an isolation amplifier 94, a phase locked loop 96 and a 135° phase shifter 98. The scrambled TV input signal 100 is fed to the descrambler 90 and, in particular, to the power divider 92. One output of divider 92 is fed via the isolation amplifier 94 to the terminal point 102. The other output of divider 92 is applied to the phase locked loop 96 which adjusts to the incoming carrier frequency and phase, and which also effectively amplifies the carrier signal by a factor equal to $\sqrt{2}$ over the output of amplifier 94. The signal loop 96 is then fed to the phase shifter 98 which imparts a 135° phase shift to the amplified signal, whereafter it is applied to terminal 102. As discussed hereinbefore, the effect of combining a first signal of a fixed carrier frequency with another signal of the same carrier frequency but of an amplitude $\sqrt{2}$ greater and displaced in phase therefrom by an angle of 135°, is to provide a resultant signal of the same amplitude and frequency as the original signal, but with its carrier component displaced or phase shifted by an angle of 90°; see FIG. 4. Accordingly, the resultant signal presented at terminal 102 is the descrambled TV input signal. The effective 90° phase shift imparted to the carrier component by the descrambler 90 restores the proper phase relationships which existed between the carrier and sideband components prior to scrambling. As noted in connection with FIG. 6, other combinations of phase and amplitude may be employed. When any other combination is used, the amplification and the phase shift required by phase shifter 98 must be altered in a complementary manner.

The descrambled signal is then fed via a buffer amplifier 104 to a standard TV receiver 106 for reproduction in the appropriate channel.

Figure 10:
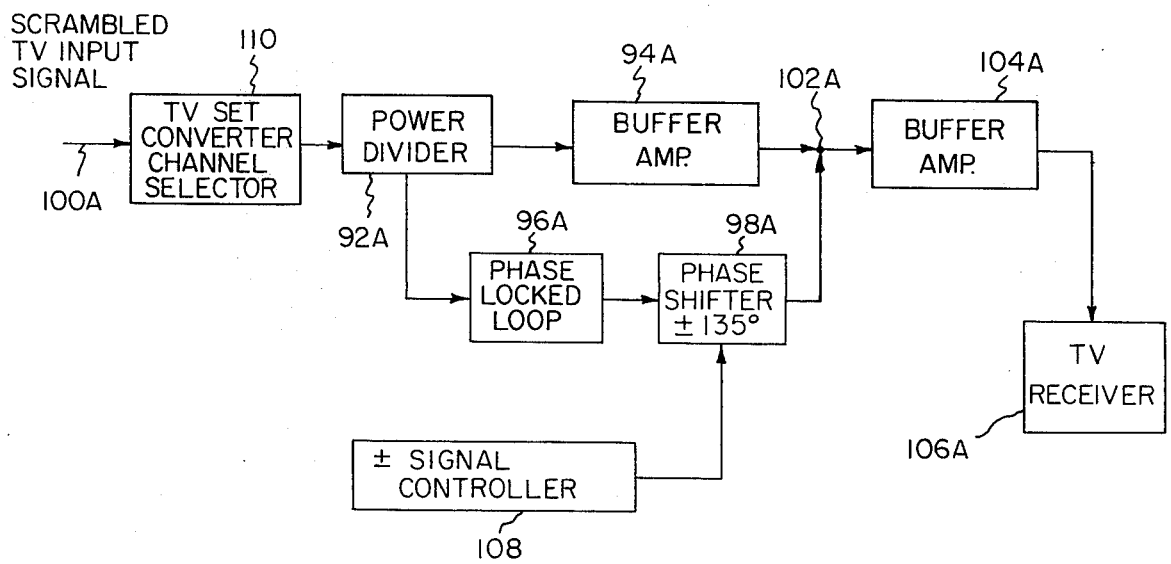
FIG. 10 is a block diagram of an alternate descrambler.

Another embodiment of a descrambler is depicted in FIG. 10, wherein similar parts to those of FIG. 9 are denoted by similar reference numerals. In this embodiment, the descrambler 90A is provided with a frequency converter or channel selector 110. The scrambled TV input signal 100A, which may be derived by antenna or cable transmission, is fed to the converter 110 and the carrier frequency of the video AM portion is converted to a predetermined value for display of the signal on a preselected TV channel to the TV receiver 106A. The converted but scrambled signal is then fed to the power divider 92A and one output thereof is applied via the buffer amplifier 94A to the terminal point 102A. The other output of divider 92A is fed to the phase locked loop 96A whose output is fed to the 135° phase shifter 98A which supplies the amplified and phase shifted signal to terminal 102A where it combines with the scrambled TV input signal to provide the resultant descrambled TV output signal, discussed hereinbefore. It is herein to be noted that if the sense of the 135° phase shift imparted to the original TV signal to scramble the same was changed from time to time, as was described in conjunction with FIG. 8, then the phase shifter 98A would be provided with a signal control input from a signal controller 108 which would change the sense of the phase shift in a precisely comlementary manner to properly descramble the scrambled signal and thus restore the phase relationships that existed between the carrier and sideband component prior to scrambling.

Figure 11:
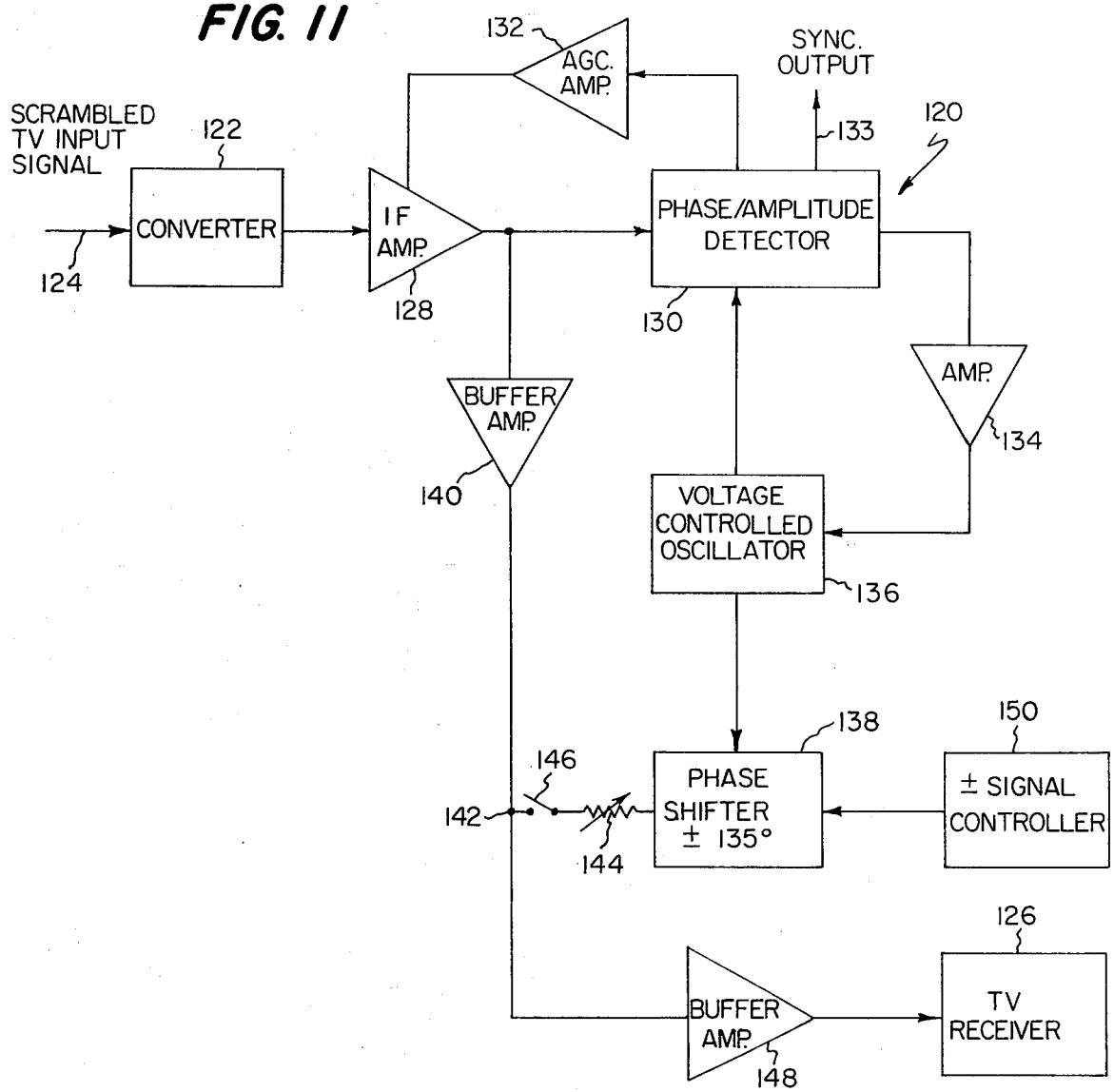
FIG. 11 is a block diagram of a preferred type of descrambler.

Referring now to FIG. 11, there is illustrated a detailed block diagram of another embodiment of a descrambler constructed pursuant to the present invention. The descrambler 120 of FIG. 11 comprises a frequency converter or channel selector 122 to which is fed the scrambled TV input signal 124. The converter 122 serves to convert the carrier frequency of the signal 124 to a predetermined value for display on a preselected channel of the TV receiver 126, whose frequency is equal to the operating frequency of descrambler 120.

The output of converter 122 is fed to an IF amplifier 128. One output of the amplifier 128 is fed to a phase and amplitude detector 130 and an AGC amplifier 132 connected in a feedback loop between detector 130 and amplifier 128. The purpose of this feedback loop is to assure proper signal amplitude to the detector 130 and a buffer amplifier 140, to be described.

In this regard it is to be noted that the composite video AM portion of a television signal comprises both picture and synchronization information. Thus, a synchronization signal 133 can be extracted from detector 130 for synchronization applications.

The output of detector 130 is fed via an amplifier 134 to a voltage controlled oscillator 136, one of whose outputs is applied to the detector 130 as a reference input and the other of whose outputs is applied to a 135° phase shifter 138. The components 130, 134 and 136 comprise a phase locked loop, as discussed hereinbefore. The output from the VCO 136 is phase shifted by the phase shifter 138 and combined with the output of the buffer amplifier 140 at a terminal point 142 to provide proper descrambling, as will now be described.

The output of phase shifter 138 is fed to terminal point 142 via a variable resistor 144 and switch 146. When switch 146 is closed, the scrambled IF output of buffer amplifier 140 is combined with the 135° phase shifted output of VCO 136 to place the carrier component of the IF output in unscrambled phase relationship with the sideband components thereof. Hence, the resultant signal at terminal point 142 is a descrambled video signal detectable by a TV receiver 126 tuned to the IF frequency and having its input connected to terminal point 142 via a buffer amplifier 148. When switch 146 is opened, the injection of the phase correcting signal at terminal point 142 is disabled to allow an unscrambled TV input signal fed to converter 122 to be received directly by TV receiver 126 when this is desired.

If a scrambled TV input signal is received by descrambler 120 from scrambler 60A (FIG. 8) in a case where signal controller 87 thereof has been used to change the sense of the phase shift imparted by phase shifter 86, the sense of the phase shift imparted by phase shifter 138 (FIG. 11) must be changed in a precisely compensating manner. For this purpose, there is provided a signal controller 150 whose output is fed directly to phase shifter 138 which accomplishes the desired purpose and whose operation is synchronized with that of signal controller 87 (FIG. 8).

Figure 12:
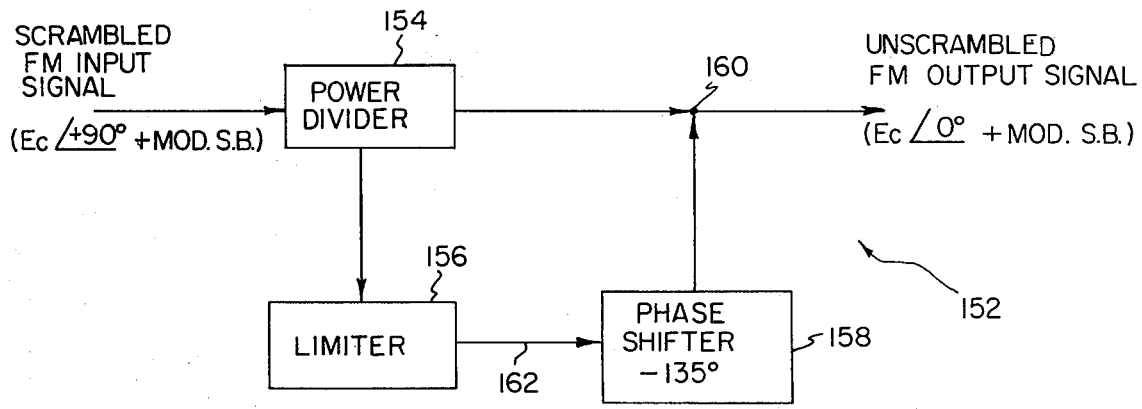
FIG. 12 is a block diagram of a descrambler for a scrambled FM transmission.

FIG. 12 depicts a descrambler operative to descramble a scrambled FM transmission such as the audio FM portion of a television signal transmission provided by the scrambler 40 (FIG. 5) when operating in conjunction with the audio FM portion of an existing television signal. It is assumed that scrambling was effected by advancing the carrier component of the audio FM portion 90° in phase relative to the sideband components thereof. The descrambler is generally designated by the reference numeral 152 and comprises a power divider 154, a limiter 156 and a 135° phase shifter 158. The scrambled FM input signal is fed to the descrambler 152 and, in particular, to the power divider 154. One output of divider 154 is fed to the terminal point 160. The other output of divider 154 is applied to the limiter 156 which limits below the modulation troughs of the divider output so that the limiter provides only the carrier component on its output lead 162. Phase shifter 158 receives the carrier component via lead 162 and retards this component in phase by 135° while at the same time amplifying it so that the amplitude of the carrier component at the output of phase shifter 158 is $\sqrt{2}$ times that of the carrier component at the output of power divider 154. These outputs are combined at terminal point 160 to produce a resultant unscrambled FM output signal whose carrier component is in its proper phase relationship with its sideband components.

It is thus seen that I have provided a new and novel scrambling and descrambling method and system for use in secure transmissions and, in particular, in conjunction with pay TV applications whether employing wireless or cable transmission. The system provides new scrambler and descrambler devices which are of relatively simple construction and inexpensively fabricated. Thus, while I have shown and described various embodiments of my invention, it will be apparent to those skilled in the art that there are many changes, modifications and improvements which may be made therein without departing from the spirit, scope and teachings of the invention.

I claim:

1. A method of scrambling a modulated signal for secure transmission thereof, said signal including carrier and sideband components having a predetermined proper phase relationship with one another, said method comprising shifting the phase of the carrier component of said modulated signal relative to the sideband components thereof by from 80 to 100 carrier degrees, said phase shifting of the carrier component being effected by adding to said modulated signal a signal having the same frequency as that of said carrier component and displaced in phase therefrom by (A + 180°)/2, where A is from 80° to 100°, the amplitude of the added signal being (Sin A/Sin(180°−A) times that of said carrier component.

2. A method according to claim 1, wherein A is 90°.

3. A method of scrambling an amplitude-modulated or frequency-modulated signal prior to transmission thereof in order to restrict intelligible detection of modulation information in the sideband components of the transmitted signal solely to receivers capable of descrambling the scrambled transmission, comprising shifting the phase of only the carrier component of the modulated signal by from 80 to 100 carrier degrees so that said carrier component is from 80 to 100 carrier degrees out of its proper phase relationship with the sideband components of the modulated signal in the transmitted version thereof, and changing the direction of the phase shift from time to time in a controlled manner to increase the security of the transmission.

4. A method according to claim 3, wherein the modulated signal to be scrambled is a portion of a composite television signal having a video AM portion and an audio FM portion.

5. A method of descrambling a modulated signal which has been scrambled by shifting the phase of its carrier component relative to its sideband components by from 80 to 100 carrier degrees in a given direction, said method comprising deriving from the scrambled modulated signal a second signal having the same frequency and phase as the carrier component thereof, shifting the phase of said second signal in the direction opposite to said given direction by (A+180°/2), where A is the phase shift that had been imparted to the carrier component of the modulated signal for the scrambling thereof, and adding the phase shifted second signal to said scrambled modulated signal with an amplitude ratio therebetween of $$\frac{\operatorname{Sin} A}{\operatorname{Sin}\left(\frac{180° - A}{2}\right)} : 1$$

to produce a descrambled output signal whose carrier and sideband components have the same amplitude and phase relationships as those had by the modulated signal before the scrambling thereof.

6. A method according to claim 5, wherein A is 90°.

7. A system for descrambling a modulated signal which has been scrambled by shifting the phase of its carrier component relative to its sideband components by from 80 to 100 carrier degrees in a given direction, comprising means for deriving from the scrambled modulated signal a second signal having the same frequency and phase as the carrier component thereof, means for shifting the phase of said second signal in the direction opposite to said given direction by (A+180°/2, where A is the phase shift that had been imparted to the carrier component of the modulated signal for the scrambling thereof, and means for adding the phase shifted second signal to said scrambled modulated signal with an amplitude ratio therebetween of $$\frac{\operatorname{Sin} A}{\operatorname{Sin}\left(\frac{180° - A}{2}\right)} : 1,$$

thereby to produce a descrambled output signal whose carrier and sideband components have the same amplitude and phase relationships as those had by the modulated signal before the scrambling thereof.

8. A system according to claim 7, wherein said phase shifting means is operative to shift the phase of said second signal by 135°, the phase shift A that had been imparted to the carrier component of the modulated signal for the scrambling thereof being 90°.

9. A system according to claim 8, for descrambling a scrambled FM signal, wherein said scrambled modulated signal is provided on a first output and a second output of a power divider, said deriving means comprising an amplitude limiter connected to receive the scrambled modulated signal on the first divider output and to supply said second signal to said phase shifting means, said adding means being connected to receive said scrambled modulated signal on the second divider output.

10. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees,
  a. wherein said modulated signal providing means includes an oscillator for supplying the carrier component, a modulating signal source and a modulator, said modulator being coupled at its input to the output of said oscillator and to the output of said modulating signal source and being coupled at its output to a signal combining means; and
  b. wherein said phase shifting means includes a phase shifter coupled at its input to said oscillator output and at its output to said signal combining means, said phase shifter shifting the phase of said oscillator output by (A+180°/2), where A is from 80° to 100°, and amplifying said oscillator output to be $$\frac{\operatorname{Sin} A}{\operatorname{Sin} \frac{(180° - A)}{2}}$$

times that of the carrier component in said modulator output, whereby the combined signal at said signal combining means is equivalent to the modulated signal output of said modulator with its carrier component shifted in phase by A carrier degrees.

11. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees, wherein said phase shifting means includes a power divider coupled at its input to said modulated signal providing means and having first and second outputs on each of which said modulated signal is reproduced, a phase locked loop coupled at its input to the first divider output and providing at its output a signal equivalent to the carrier component of said modulated signal, a 90° phase shifter coupled at its input to said output of said phase locked loop and providing at its output a signal equivalent to said carrier component shifted in phase by 90 carrier degrees, a 180° phase shifter coupled at its input to said output of said phase locked loop and providing at its output a signal equivalent to said carrier component shifted in phase by 180 carrier degrees, the second divider output and the 180° phase shifter output being connected to a first signal combining junction at which the 180° phase shifter output cancels the carrier component in the second divider output whereby only the sideband components in the second divider output remain at the first signal combining junction, and a second signal combining junction coupled to said first signal combining junction and to the 90° phase shifter output for adding said remaining sideband components to the 90° phase shifted carrier component.

12. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees, wherein said phase shifting means includes a power divider coupled at its input to said modulated signal providing means and having first and second outputs on each of which said modulated signal is reproduced, a phase locked loop coupled at its input to the first divider output and providing at its output a signal equivalent to the carrier component of said modulated signal amplified by $\sqrt{2}$, a 135° phase shifter coupled at its input to said output of said phase locked loop and providing at its output a signal equivalent to said amplified carrier component shifted in phase by 135 carrier degrees, and a signal combining junction to which the respective outputs of said second divider and said 135° phase shifter are fed to produce a combined signal equivalent to the sum of the carrier component of said modulated signal shifted in phase by 90 carrier degrees and said sideband components.

13. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees, said system being for use with a television signal as said modulated signal to be scrambled and including a cable television processor having a first frequency converter, an i.f. amplifier and a second frequency converter, said first frequency converter being coupled at its input to said modulated signal providing means, wherein said phase shifting means includes a power divider coupled at its input to the output of said first frequency converter and having first and second outputs on each of which said modulated signal is reproduced at an i.f. frequency determined by said first converter, a phase locked loop coupled at its input to the first divider output and providing at its output a signal equivalent to the carrier component of the reproduced modulated signal, a 90° phase shifter coupled at its input to said output of said phase locked loop and providing at its output a signal equivalent to said carrier component of the reproduced modulated signal shifted in phase by 90 carrier degrees, a 180° phase shifter coupled at its input to said output of said phase locked loop and providing at its output a signal equivalent to said carrier component of the reproduced modulated signal shifted in phase by 180 carrier degrees, the second divider output being coupled by way of said i.f. amplifier to a first signal combining junction, the respective outputs of the 180° phase shifter and 90° phase shifter being coupled to a second signal combining junction to produce a combined signal equivalent to the vector sum of said respective outputs, means for supplying said combined signal to said first signal combining junction to produce a resultant signal equivalent to the vector sum of said combined signal and said second divider output from said i.f. amplifier, and means for applying said resultant signal to said second frequency converter, said second frequency converter providing an output equivalent to said television signal with its carrier component shifted in phase by 90 carrier degrees.

14. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees, a signal controller being coupled to said phase shifting means for controlling said phase shifting means from time to time to change the sense of phase shift imparted by said phase shifting means from lagging to leading and from leading to lagging senses.

15. A system for scrambling a modulated signal for secure transmission thereof, said signal including carrier and sideband components having a predetermined proper phase relationship with one another, said system comprising means for providing said modulated signal to be scrambled, and means coupled to said modulated signal providing means for shifting the phase of the carrier component of said modulated signal relative to the sideband components thereof by from 80 to 100 carrier degrees, a signal processor being provided having an input side and an output side, said phase shifting means being coupled to said signal processor intermediate said input and output sides, said processor including a first frequency converter at said input side connected to said modulated signal providing means for receiving said modulated signal to be scrambled and converting the carrier frequency thereof to a first predetermined value, said processor including a second frequency converter at said output side for converting the carrier frequency of the output of said phase shifting means to a second predetermined value for transmission, whereby said shifting of the phase of the carrier component of said modulated signal is effected at said first predetermined frequency value.

16. A system according to claim 15, wherein said phase shifting means includes a power divider coupled at its input to the output of said first frequency converter, said power divider having first and second outputs on each of which said modulated signal is reproduced at said first predetermined frequency value, a phase locked loop coupled at its input to the first divider output and providing at its output a signal equivalent to the carrier component of the reproduced modulated signal, a 135° phase shifter coupled at its input to said output of said phase locked loop and providing at its output a signal equivalent to said carrier component of the reproduced modulated signal shifted in phase by 135 carrier degrees, and a signal combiner for adding the output signal of said 135° phase shifter to said reproduced modulated signal on said second output of said power divider at respective amplitudes having a ratio of $\sqrt{2}:1$, said signal combiner being connected at its output to the input of said second frequency converter.

* * * * *